(12) United States Patent
Maeda et al.

(10) Patent No.: US 6,746,722 B2
(45) Date of Patent: Jun. 8, 2004

(54) FLUORINE-CONTAINING PHENYLMALEIMIDE DERIVATIVE, POLYMER, CHEMICALLY AMPLIFIED RESIST COMPOSITION, AND METHOD FOR PATTERN FORMATION USING THE COMPOSITION

(75) Inventors: Katsumi Maeda, Tokyo (JP); Kaichiro Nakano, Tokyo (JP)

(73) Assignee: NEC Corporation, Tokyo (JP)

( * ) Notice: Subject to any disclaimer, the term of this patent is extended or adjusted under 35 U.S.C. 154(b) by 15 days.

(21) Appl. No.: 10/198,958

(22) Filed: Jul. 22, 2002

(65) Prior Publication Data

US 2003/0036618 A1 Feb. 20, 2003

(30) Foreign Application Priority Data

Jul. 24, 2001 (JP) ........................................ 2001-223127

(51) Int. Cl.$^7$ ............................ C08J 7/04; C08F 26/06; C07D 207/444
(52) U.S. Cl. ..................... 427/510; 427/553; 427/554; 427/555; 522/2; 522/31; 522/152; 522/914; 526/248; 526/262; 548/549
(58) Field of Search ............................... 522/2, 31, 152, 522/914; 526/248, 262; 548/549; 427/510, 553, 554, 555

(56) References Cited

U.S. PATENT DOCUMENTS

| | | | | |
|---|---|---|---|---|
| 4,046,777 A | * | 9/1977 | Muller | 548/549 |
| 5,024,694 A | * | 6/1991 | Schallner et al. | 548/549 |

FOREIGN PATENT DOCUMENTS

| | | |
|---|---|---|
| JP | 2-27660 | 6/1990 |
| JP | 5-134416 | 5/1993 |
| JP | 10-207067 | 8/1998 |
| JP | 10-218941 | 8/1998 |
| JP | 3058126 | 4/2000 |

OTHER PUBLICATIONS

R.R. Kunz et al., "Outlook for 157 nm resist design", J. Vac Sci. Technol. B 17(6) pp. 3267–3272, Nov./Dec. 1999.
Hiroshi Ito et al., "Applications of photoinitiators to the Design of Resists for Semiconductor Manufacturing", American Chemical Society Symposium Series, vol. 242, pp. 11–23.
O. Nalamasu et al., "The Synthesis, Characterization and Lithography of a–Substituted 2–Nitrobenzyl Arylsulfonate Photo–Acid Generators with Improved Resistance to Post Exposure Bake", SPIE Proceeding, vol. 2195, p. 137 (1994).
Takumi Ueno et al., Chemical Amplification Positive Resist Systems Using Novel Sulfonates as Acid Generators, Proceeding of PME 89, Kodansha, pp. 413–424 (1990).
T. M. Bloomstein et al., "Critical issues in 157 nm lithography", J. Vac. Sci. Technol. B 16(6), pp. 3154–3157 Nov./Dec. 1998.
James Crivello et al., "A New Preparation of Triaryisulfonium and –selenonium Salts via the Copper (II)–Catalyzed Arylation of sulfides and Selenides with Diaryliodonium Salts", J. Org. Chem., vol. 43, No. 15, pp. 3055–3058 (1978).

\* cited by examiner

Primary Examiner—Fred Teskin
(74) Attorney, Agent, or Firm—Young & Thompson

(57) ABSTRACT

A fluorine-containing phenylmaleimide derivative having a specific structure. A polymer obtained by polymerizing monomers containing the derivative. A polymer containing a specific structural unit and having a weight-average molecular weight of 2,000 to 200,000. A chemically amplified resist composition containing the polymer and a photo acid generator, wherein the proportion of the polymer relative to the total of the polymer and the photo acid generator is 70 to 99.8% by mass. A method for pattern formation, which comprises coating the above composition on a to-be-processed substrate, exposing with a light of 180 nm or less wavelength, and conducting baking and development.

10 Claims, No Drawings

FLUORINE-CONTAINING PHENYLMALEIMIDE DERIVATIVE, POLYMER, CHEMICALLY AMPLIFIED RESIST COMPOSITION, AND METHOD FOR PATTERN FORMATION USING THE COMPOSITION

BACKGROUND OF THE INVENTION

1. Field of the Invention

The present invention relates to a method for pattern formation wherein a fine pattern used in fields such as semiconductor device and the like is formed. The present invention relates also to a chemically amplified resist used in pattern formation, a polymer useful for obtaining this resist composition, and a novel compound as a raw material for the polymer.

2. Description of the Related Art

In production of various electronic devices represented by semiconductor device, requiring microfabrication of half-micron order, demands for higher integration density and higher integration level of such devices are growing. Therefore, the requirement for the photolithography used for fine pattern formation is becoming increasingly severe. In production of, in particular, a DRAM having an integration level of 1 G bits or more wherein a processing technique of 0.13 μm or less is required, a photolithography using an ArF excimer laser (193 nm) is going to be utilized. In formation of an even finer pattern, utilization of a photolithography using a $F_2$ excimer laser (157 nm) has been considered recently (R. R. Kunz et al., Journal of Vacuum Science and Technology, Vol. B17 (No. 6), pp. 3267–3272 (1999)).

Hence, it is desired to develop a resist material corresponding to the photolithography by $F_2$ excimer laser beam. In developing a resist to be exposed to the $F_2$ excimer laser beam, the cost performance of laser must be improved because the gas as a raw material for the laser has a short life and the laser equipment is expensive. Therefore, a high resolution corresponding to finer pattern forming and a high sensitivity are strongly required for the resist. As the method for allowing a resist to have a high sensitivity, it is well known to use a chemically amplified resist using a photo acid generator as a sensitizer. As a typical example of such a chemically amplified resist, there is described, in JP-B-2-27660, a resist consisting of a combination of triphenylsulfonium hexafluoroarsenate and a poly (p-tert-butoxycarbonyloxy-α-methylstyrene). Such a chemically amplified resist is currently in wide use as a resist for KrF excimer laser (248 nm) (for example, Hiroshi Ito and C. Grant Wilson, American Chemical Society Symposium Series, Vol. 242, pp. 11–23 (1984)). The feature of the chemically amplified resist lies in that the photo acid generator contained as a component generates a protonic acid when exposed to a light and, in the heat treatment after light exposure, the acid gives rise to an acid-catalyzed reaction with the resist resin, etc. In this way is achieved a sensitivity far higher than those of conventional resists whose photo-reaction efficiency (the reaction per one photon) are less than 1. Most of the resists developed recently are chemically amplified type.

In the lithography using a light having a short wavelength of 180 nm or less typified by a $F_2$ excimer laser beam, however, the resist used therein for formation of a fine pattern needs to have a new property not exhibited by conventional materials, i.e. a transparency to a light of 180 nm or less to be applied.

In conventional resist materials for KrF excimer laser and ArF excimer laser, there are mostly used, as the resin component, a poly(p-vinylphenol), an alicyclic resin, etc. These resins, however, show very strong absorption to a light of 180 nm or less wavelength. Therefore, the most part of the light applied is absorbed at the surface of such a resist and the light applied does not reach a substrate on which the resist is coated, making it impossible to form a fine resist pattern. For this reason, it is impossible to use a conventional resin in a photolithography using a light of short wavelength of 180 nm or less. Hence, a resist resin transparent to a wavelength of 180 nm or less is desired strongly.

As the polymer compound having transparency to a $F_2$ excimer laser beam (157 nm), fluorine-containing resins are considered to be promising (R. R. Kunz et al., Journal of Vacuum Science and Technology, Vol. B17 (No. 6), pp. 3267–3272 (1999), and T. M. Bloomstein et al., Journal of Vacuum Science and Technology, Vol. B16 (No. 6), pp. 3154–3157 (1998)).

Conventional fluorine-containing resins typified by polytetrafluoroethylene, however, have no functional group such as to give rise to a chemical reaction by the action of an acid, resulting in a change in solubility in alkali developing solution and further have no polar group (resultantly have low adhesivity to substrate); therefore, can not be used as a resin for chemically amplified resist.

Hence, a new resin material for resist usable in a lithography using a light of 180 nm or less is desired strongly.

SUMMARY OF THE INVENTION

It is an object of the present invention to provide a chemically amplified resist composition which can be suitably used in a lithography using a light of 180 nm or less wavelength, which enables formation of a fine pattern. It is also an object of the present invention to provide a polymer suitable for obtaining the above resist composition, a novel compound suitable as a raw material for the polymer, and a method for pattern formation capable of forming a fine pattern using the above resist composition.

The present invention lies in a fluorine-containing phenylmaleimide derivative represented by the general formula (1).

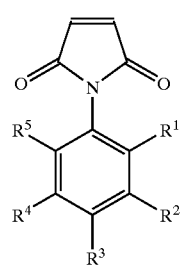

(1)

(In the formula (1), one of $R^1$, $R^2$, $R^3$, $R^4$ and $R^5$ is a hydroxy group, an alkoxyl group, or an acid-dissociable organic group of 20 or less carbon atoms capable of generating a hydroxy group when decomposed by an acid; at least two of the remainder are each a fluorine atom; and when there is still a remainder, it is a hydrogen atom.)

The present invention lies also in a polymer characterized by being obtained by polymerizing monomers containing the above fluorine-containing phenylmaleimide derivative.

The present invention lies further in a polymer characterized by containing at least a structural unit represented by the general formula (2) and having a weight-average molecular weight of 2,000 to 200,000.

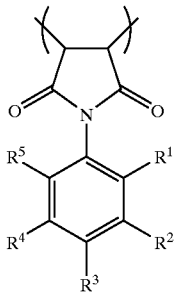

(2)

(In the formula (2), one of $R^1$, $R^2$, $R^3$, $R^4$ and $R^5$ is a hydroxy group, an alkoxyl group, or an acid-dissociable organic group of 20 or less carbon atoms capable of generating a hydroxy group when decomposed by an acid; at least two of the remainder are each a fluorine atom; and when there is still a remainder, it is a hydrogen atom.)

Preferably, the polymer contains, in addition to the structural unit represented by the general formula (2), a structural unit represented by the following general formula (3).

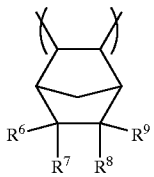

(3)

(In the above formula, $R^6$, $R^7$, $R^8$ and $R^9$ are each independently a hydrogen atom, a fluorine atom, a trifluoromethyl group, a hydroxy group, a hydroxyalkyl group, a 1,1,1,3,3,3-hexafluoro-2-hydroxyisopropyl group, a 1,1,1-trifluoro-2-trifluoromethyl-2-hydroxypropyl group, an acid-dissociable organic group of 20 or less carbon atoms capable of generating a 1,1,1,3,3,3-hexafluoro-2-hydroxyisopropyl group when decomposed by an acid, an acid-dissociable organic group of 20 or less carbon atoms capable of generating a 1,1,1-trifluoro-2-trifluoromethyl-2-hydroxypropyl group when decomposed by an acid, or an acid-dissociable organic group of 20 or less carbon atoms capable of generating a carboxy group when decomposed by an acid.)

Preferably, these polymers are a copolymer which contains, in addition to the structural unit represented by the general formula (2), at least one kind of other structural unit and wherein the proportion of the structural unit represented by the general formula (2) in the total structural units of the copolymer is 5 to 90 mole %.

The present invention further includes a chemically amplified resist composition characterized by containing at least the above polymer and a photo acid generator capable of generating an acid when exposed to a light and also characterized in that the proportion of the polymer to the total mass of the polymer and the photo acid generator is 70 to 99.8% by mass and the proportion of the photo acid generator to the total mass of the polymer and the photo acid generator is 0.2 to 30% by mass.

The present invention includes also a method for pattern formation, characterized by comprising at least a step of coating the above chemically amplified resist composition on a to-be-processed substrate, a step of exposing using a light of 180 nm or less wavelength, a step of conducting baking, and a step of conducting development.

In the method, the light for the exposure is preferably a light of 120 to 180 nm wavelength. Also, the light for the exposure is preferably a $F_2$ excimer laser beam.

DETAILED DESCRIPTION OF THE PREFERRED EMBODIMENTS

In the general formula (1) and the general formula (2), one of $R^1$, $R^2$, $R^3$, $R^4$ and $R^5$ is a hydroxy group, an alkoxyl group, or an acid-dissociable organic group of 20 or less carbon atoms capable of generating a hydroxy group when decomposed by an acid; at least two of the remainder are each a fluorine atom; and when there is still a remainder, it is a hydrogen atom. That is, one of the five groups of $R^1$ to $R^5$ is a hydroxy group, an alkoxyl group, or an acid-dissociable organic group of 20 or less carbon atoms capable of generating a hydroxy group when decomposed by an acid; as to the remaining four groups, all of the four groups are a fluorine atom, or three groups thereof are a fluorine atom and other one group is a hydrogen atom, or two groups thereof are a fluorine atom and other two groups are a hydrogen atom.

As preferable specific examples of the alkoxyl group, there can be mentioned methoxy group, ethoxy group, n-propoxy group, n-butoxy group, n-pentyloxy group, n-hexyloxy group, n-heptyloxy group, n-octyloxy group and n-nonyloxy group. The alkoxy group can be other group.

As preferable specific examples of the acid-dissociable organic group of 20 or less carbon atoms capable of generating a hydroxy group when decomposed by an acid, there can be mentioned t-butoxy group, tetrahydropyranyloxy group, tetrahydrofuranyloxy group, 1-methoxyethoxy group, 1-ethoxyethoxy group, 1-propoxyethoxy group, 1-butoxyethoxy group, methoxyethoxymethoxy group, methoxymethoxy group and t-butoxycarbonyloxy group. The acid-dissociable organic group can be other group.

The polymer of the present invention may be a polymer obtained by polymerizing a maleimide derivative represented by the general formula (1), or may be a copolymer obtained by copolymerizing a maleimide derivative represented by the general formula (1) and other polymerizable compound.

As a preferable specific example of the copolymer, there can be mentioned a polymer containing, in addition to a structural unit represented by the general formula (2), a structural unit represented by the following general formula (3). However, the copolymer can be other polymer.

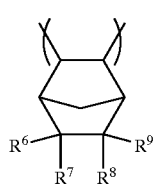

(3)

(In the above formula, $R^6$, $R^7$, $R^8$ and $R^9$ are each independently a hydrogen atom, a fluorine atom, a trifluoromethyl group, a hydroxy group, a hydroxyalkyl group, a 1,1,1,3,3,3-hexafluoro-2-hydroxyisopropyl group, a 1,1,1-trifluoro-2-trifluoromethyl-2-hydroxypropyl group, an acid-dissociable organic group of 20 or less carbon atoms capable of generating a 1,1,1,3,3,3-hexafluoro-2-hydroxyisopropyl group when decomposed by an acid, an acid-dissociable organic group of 20 or less carbon atoms capable of generating a 1,1,1-trifluoro-2-trifluoromethyl-2-hydroxypropyl group when decomposed by an acid, or an acid-dissociable organic group of 20 or less carbon atoms capable of generating a carboxy group when decomposed by an acid.)

As preferable specific examples of the acid-dissociable organic group of 20 or less carbon atoms capable of generating a 1,1,1,3,3,3-hexafluoro-2-hydroxyisopropyl group when decomposed by an acid, there can be mentioned 1,1,1,3,3,3-hexafluoro-2-t-butoxyisopropyl group, 1,1,1,3,3,3-hexafluoro-2-t-butoxycarbonyloxyisopropyl group, 1,1,1,3,3,3-hexafluoro-2-tetrahydropyranyloxyisopropyl group, 1,1,1,3,3,3-hexafluoro-2-(1-ethoxyethoxy)isopropyl group, 1,1,1,3,3,3-hexafluoro-2-(1-butoxyethoxy)isopropyl group, 1,1,1,3,3,3-hexafluoro -2-tetrahydrofuranyloxyisopropyl group, 1,1,1,3,3,3-hexafluoro-2-(1-methoxyethoxy) isopropyl group, 1,1,1,3,3,3-hexafluoro-2-(1-propoxyethoxy)isopropyl group, 1,1,1,3,3,3-hexafluoro-2-(methoxyethoxymethoxy)isopropyl group, and 1,1,1,3,3,3-hexafluoro-2-(methoxymethoxy)isopropyl group. However, the acid-dissociable organic group can be a group other than the above groups.

As preferable specific examples of the acid-dissociable organic group of 20 or less carbon atoms capable of generating a 1,1,1-trifluoro-2-trifluoromethyl-2-hydroxypropyl group when decomposed by an acid, there can be mentioned 1,1,1-trifluoro-2-trifluoromethyl-2-t-butoxypropyl group, 1,1,1-trifluoro-2-trifluoromethyl-2-t-butoxycarbonyloxypropyl group, 1,1,1-trifluoro-2-trifluoromethyl-2-tetrahydropyranyloxypropyl group, 1,1,1-trifluoro-2-trifluoromethyl-2-(1-ethoxyethoxy)propyl group, 1,1,1-trifluoro-2-trifluoromethyl-2-(1-butoxyethoxy)propyl group, 1,1,1-trifluoro-2-trifluoromethyl-2-tetrahydrofuranyloxypropyl group, 1,1,1-trifluoro-2-trifluoromethyl-2-(1-methoxyethoxy)propyl group, 1,1,1-trifluoro-2-trifluoromethyl-2-(1-propxyethoxy)propyl group, 1,1,1-trifluoro-2-trifluoromethyl-2-(methoxyethoxymethoxy)propyl group, and 1,1,1-trifluoro-2-trifluoromethyl-2-(methoxymethoxy)propyl group. However, the acid-dissociable organic group can be a group other than the above groups.

As preferable specific examples of the acid-dissociable organic group of 20 or less carbon atoms capable of generating a carboxy group when decomposed by an acid, there can be mentioned t-butoxycarbonyl group, tetrahydropyranyloxycarbonyl group, tetrahydrofuranyloxycarbonyl group, ethoxyethyloxycarbonyl group, butoxyethyloxycarbonyl group, methoxyethyloxycarbonyl group and methoxyethoxyethyloxycarbonyl group. However, the acid-dissociable organic group can be a group other than the above groups.

Also, the polymer having a structural unit represented by the general formula (2) may contain, in addition to a structural unit represented by the general formula (3), other copolymerizable structural unit. Or, it is possible that the polymer having a structural unit represented by the general formula (2) contains no structural unit represented by the general formula (3) and contains other structural unit.

As the other copolymerizable monomer used for obtaining the above other structural unit, there can be mentioned, for example, (meth)acrylic acid; aliphatic esters of (meth)acrylic acid, such as methyl (meth)acrylate, ethyl (meth)acrylate and the like; alicyclic esters of (meth)acrylic acid, such as adamantyl (meth)acrylate, tricyclodecyl (meth)acrylate, tetracyclododecyl (meth)acrylate, norbornyl (meth)acrylate, isobornyl (meth)acrylate and the like; substituted or unsubstituted tetracyclododecyl derivatives (there can be mentioned, for example, 3-tetracyclo $[4.4.0.1^{2,5}.1^{7,10}]$dodecene-8-carboxylic acid, 3-tetracyclo$[4.4.0.1^{2,5}.1^{7,10}]$ dodecene-8-ol, 3-tetracyclo$[4.4.0.1^{2,5}.1^{7,10}]$dodecene-8-methanol, t-butyl 3-tetracyclo$[4.4.0.1^{2,5}.1^{7,10}]$dodecene-8-carboxylate and 3-tetracyclo$[4.4.0.1^{2,5}.1^{7,10}]$dodecene); vinyl ethers (there can be mentioned, for example, ethyl vinyl ether, isobutyl vinyl ether, 2-vinyloxyethoxybenzene, and 1,2,3,4,5-pentafluoro-6-(2-vinyloxyethoxy)benzene); fluorine-containing styrene derivatives (there can be mentioned, for example, trifluoromethylstyrene, pentafluorostyrene, α, β, β-trifluorostyrene and β, β-difluorostyrene); fluoroethylenes such as tetrafluoroethylene and the like. Other monomer can be used as well.

The proportion of the structural unit represented by the general formula (2) in the total structural units of the copolymer is preferably 5 mole % or more, more preferably 10 mole % or more. Meanwhile, it is preferably 100 mole % or less, more preferably 90 mole % or less. The reason is that when the proportion of the structural unit represented by the general formula (2) is 5 mole % or more, the resin is superior in transparency and resolution characteristics.

The polymer of the present invention can be produced by an ordinary polymerization process such as radical polymerization, anionic polymerization or the like. The radical polymerization is carried out, for example, by adding an appropriate radical polymerization initiator (for example, azobisisobutyronitrile) in dry tetrahydrofuran or toluene in an inert gas (for example, argon or nitrogen) atmosphere and stirring the resulting mixture at 50 to 100° C. for 0.5 to 50 hours. The anionic polymerization is carried out, for example, by adding an appropriate anionic polymerization initiator (for example, n-butyllithium, sec-butyllithium or potassium t-butoxide) in dry tetrahydrofuran in an inert gas (for example, argon or nitrogen) atmosphere and stirring the resulting mixture at −78 to 0° C. for 0.5 to 24 hours.

The weight-average molecular weight of the polymer is preferably 2,000 to 200,000. It is because when the molecular weight is 2,000 or more, formation of resist film is easy and, when the molecular weight is 200,000 or less, the resin is superior in solubility in solvent and resolution characteristics.

The chemically amplified resist composition of the present invention contains at least the polymer of the present invention and a photo acid generator and may further contain a solvent as necessary.

The photo acid generator used in the present invention is desirably a photo acid generator which generates an acid when exposed to a light of 180 nm or less, more preferably 120 to 180 nm. The photo acid generator can be appropriately selected from such photo acid generators as its mixture with the above-mentioned polymer of the present invention, etc. is sufficiently soluble in the organic solvent used and the resulting solution can form a uniform film when coated by spin coating or the like. The photo acid generator can be used singly or in admixture of two or more kinds.

As examples of the photo acid generator usable, there are triphenylsulfonium salt derivatives by J. V. Crivello et al. described in Journal of the Organic Chemistry, Vol. 43, No. 15, pp. 3055 to 3058 (1978); other onium salts represented thereby (for example, compounds such as sulfonium salt, iodonium salt, phosphonium salt, diazonium salt, ammonium salt and the like); 2,6-dinitrobenzyl esters (O. Nalamasu et al., SPIE Proceeding, Vol. 2195, p. 137 (1994)); 1,2,3-tri(methanesulfonyloxy)benzene (Takumi Ueno et al., Proceeding of PME '89, Kodansha, pp. 413 to 424 (1990)); and sulfosuccinimides disclosed in JP-A-5-134416.

The content of the photo acid generator is preferably 0.2% by mass or more, more preferably 1% by mass or more relative to the total of the polymer and the photo acid generator in order to allow the resulting chemically amplified resist composition to have a sufficient sensitivity and form a good pattern. Meanwhile, the content is preferably 30% by mass or less, more preferably 15% by mass or less in order to form a uniform film and suppress the generation of scum after development.

For the same reasons, the content of the polymer is preferably 70 to 99.8% by mass relative to the total of the polymer and the photo acid generator.

The chemically amplified resist composition of the present invention is ordinarily produced in the form of a resist solution by dissolving the components such as polymer, photo acid generator and the like in an appropriate solvent and is coated on a to-be-processed substrate by spin coating or the like.

As to the solvent, there is no particular restriction as long as it is such an organic solvent as components such as polymer, photo acid generator and the like are sufficiently soluble therein and the resulting solution can form a uniform film by spin coating or the like. The solvent can be used singly or in admixture of two or more kinds. As the solvent, there can be specifically mentioned n-propyl alcohol, iso-propyl alcohol, n-butyl alcohol, tert-butyl alcohol, methyl cellosolve acetate, ethyl cellosolve acetate, propylene glycol monoethyl ether acetate, propylene glycol monomethyl ether acetate, methyl lactate, ethyl lactate, 2-methoxybutyl acetate, 2-ethoxyethyl acetate, methyl pyruvate, ethyl pyruvate, methyl 3-methoxypropionate, ethyl 3-methoxypropionate, N-methyl-2-pyrrolidinone, cyclohexanone, cyclopentanone, cyclohexanol, methyl ethyl ketone, 1,4-dioxane, ethylene glycol monomethyl ether, ethylene glycol monomethyl ether acetate, ethylene glycol monoethyl ether, ethylene glycol monoisopropyl ether, diethylene glycol monomethyl ether, diethylene glycol dimethyl ether, etc. Other solvent can be used as well.

The "basic" components of the chemically amplified resist composition of the present invention is the above-mentioned resin, photo acid generator and solvent. Other components such as dissolution inhibitor, surfactant, pigment, stabilizer, coatability improver, dye and the like can be added as necessary to produce the chemically amplified resist.

The chemically amplified resist composition of the present invention is coated on a to-be-processed substrate; to the resulting material is exposed with a light having a wavelength of 180 nm or less, preferably 120 to 180 nm; baking is conducted; development is conducted; thereby, a pattern can be formed.

The light for the exposure is preferably a $F_2$ excimer laser beam.

The present invention is described below in more detail by way of Examples. However, the Examples restrict the present invention in no way. Incidentally, as to the reagents, etc., commercial high-purity products were used in the following unless otherwise specified.

EXAMPLE 1

Synthesis of 2,3,5,6-tetrafluoro-4-methoxyphenylmaleimide

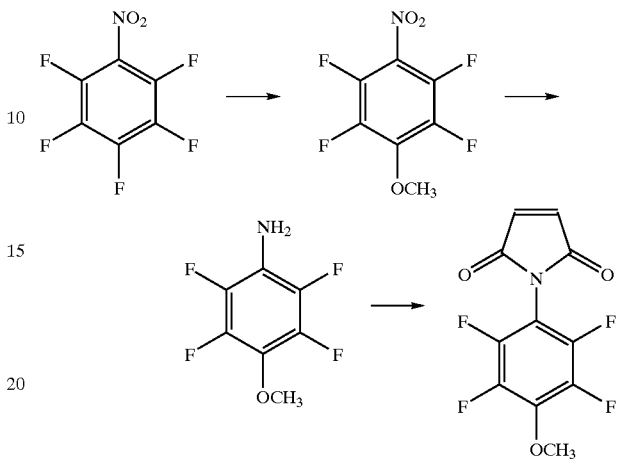

50 g of pentafluoronitrobenzene was dissolved in 400 ml of dry methanol. Thereto was dropwise added, with ice-cooling, a solution of 13.95 g of sodium methoxide dissolved in 50 ml of dry methanol. A reaction was allowed to take place at room temperature for 2 hours. The reaction mixture was concentrated to a volume of about ⅓ under vacuum. The residue was poured into 500 ml of water. The organic layer was extracted with 300 ml of ether. The ether layer was washed with an aqueous sodium chloride solution and dried over $MgSO_4$. The resulting solution was subjected to vacuum distillation to remove the solvent. The residue was subjected to vacuum distillation (96 to 97° C./0.35 mmHg (47 Pa)) to obtain 38 g of 2,3,5,6-tetrafluoro-4-methoxynitrobenzene (yield: 72%).

Then, 25 g of the 2,3,5,6-tetrafluoro-4-methoxynitrobenzene was added to a dispersion of 30.3 g of tin dispersed in 230 ml of 95% ethanol. Thereto was dropwise added 70 ml of concentrated hydrochloric acid with ice-cooling. The mixture was refluxed for 2 hours with heating. Then, the reaction mixture was poured into 1,000 ml of water. Thereto was added an aqueous sodium hydroxide solution until the water layer became alkaline. The organic layer was extracted with 500 ml of ether. The ether layer was washed with an aqueous sodium chloride solution and dried over $MgSO_4$. The resulting solution was subjected to vacuum distillation to remove the ether. The residue was subjected to recrystallization from ligroin to obtain 6 g of 2,3,5,6-tetrafluoro-4-methoxyaniline (yield: 28%).

Then, a solution of 10 g of the 2,3,5,6-tetrafluoro-4-methoxyaniline dissolved in 50 ml of acetic acid was dropwise added to a solution of 15.08 g of maleic anhydride dissolved in 150 ml of acetic acid, with argon being bubbled. A reaction was allowed to take place at 120° C. for 8 hours. The reaction mixture was poured into 700 ml of ice water. The resulting crystals were collected by filtration, washed with a large amount of water, and recrystallized from a ligroin/toluene mixed solvent to obtain 8.3 g of 2,3,5,6-tetrafluoro-4-methoxyphenylmaleimide (yield: 59%). Melting point: 91° C.; $^1$H-NMR (CDCl$_3$) δ: 4.14 (3H,s), 6.97 (2H,s); $^{13}$C-NMR (CDCl$_3$) δ: 62.3 (t), 104.0 (t), 135.2 (s), 139.8, 142.3 (m), 142.9, 145.4 (m), 150.5 (s)

EXAMPLE 2

Synthesis of 2,3,5,6-tetrafluoro-4-hydroxyphenylmaleimide of the Following Structure

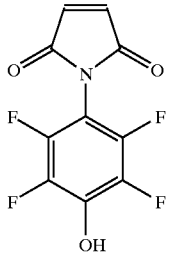

2 g of the 2,3,5,6-tetrafluoro-4-methoxyphenylmaleimide obtained in Example 1 was dissolved in 10 ml of dry methylene chloride. Thereto was added 15 ml of a methylene chloride solution containing 1 M of boron tribromide. The mixture was stirred at room temperature for 3 days in an argon atmosphere. The reaction mixture was poured into 200 ml of ice water. The organic layer was extracted with ether. The ether layer was washed with an aqueous sodium chloride solution and dried over magnesium sulfate. The resulting solution was subjected to vacuum distillation to remove ether. The residue was recrystallized from ligroin/toluene to obtain 1 g of an intended compound (yield: 53%).

EXAMPLE 3

4-(1-Ethoxyethoxy)-2,3,5,6-tetrafluorophenylmaleimide of the Following Structure

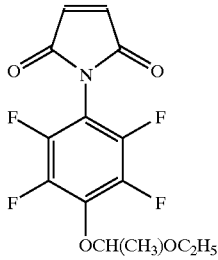

3 g of the 2,3,5,6-tetrafluoro-4-hydroxyphenylmaleimide obtained in Example 2 was dissolved in 20 ml of methylene chloride. Thereto was added 2.1 g of ethyl vinyl ether and 58 mg of pyridine salt of p-toluenesulfonic acid. The mixture was stirred at room temperature for 12 hours. 100 ml of ether was added. The mixture was washed with an aqueous sodium chloride solution. The organic layer was dried over magnesium sulfate. The resulting solution was subjected to vacuum distillation to remove the solvent to obtain 2.8 g of an intended compound (yield: 73%).

EXAMPLE 4

Synthesis of Resin (Polymer) of the Following Structure

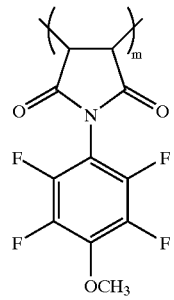

4 g of the 2,3,5,6-tetrafluoro-4-methoxyphenylmaleimide obtained in Example 1 was dissolved in 22 ml of toluene. Thereto was added 95.5 mg of azobisisobutyronitrile (AIBN). The mixture was stirred in an argon atmosphere at 100° C. for 11 hours. After being allowed to cool, the mixture was dropped into 250 ml of ligroin. The precipitated polymer was collected by filtration and reprecipitated for purification, using tetrahydrofuran (THF)-ligroin to obtain 2.6 g of an intended polymer (yield: 65%). Weight-average molecular weight (Mw)=4,500 (polystyrene equivalent); dispersity (Mw/Mn)=2.6

EXAMPLE 5

Synthesis of Resin (Copolymer) of the Following Structure

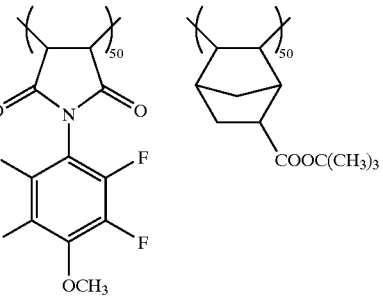

3 g of the imide derivative obtained in Example 1 and 2.1 g of t-butyl 5-norbornene-2-carboxylate were dissolved in 22 ml of toluene. Thereto was added 143 mg of AIBN. The mixture was stirred in an argon atmosphere at 100° C. 10 hours later, the reaction mixture was poured into 300 ml of ligroin. The precipitated polymer was collected by filtration and reprecipitated for purification, using THF-ligroin to obtain 2.1 g of an intended copolymer (yield: 41%). The proportions of the structural unit of the general formula (2) and the structural unit of the general formula (3) in the copolymer obtained were 50:50 from the integration ratio of the $^1$H-NMR of the copolymer. Mw=5,200; Mw/Mn=2.2

EXAMPLE 6

Synthesis of Resin (Copolymer) of the Following Structure

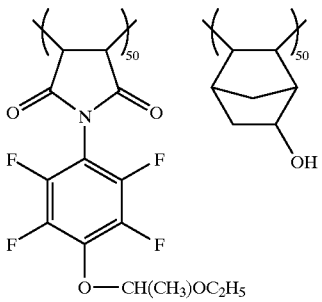

1.91 g of a copolymer was obtained (yield: 48%) in the same manner as in Example 5 except that the imide derivative obtained in Example 1 was replaced by the imide derivative obtained in Example 3 and that t-butyl 5-norbornene-2-carboxylate was replaced by 0.99 g of 5-norbornene-2-ol. The proportions of the structural unit of the general formula (2) and the structural unit of the general formula (3) in the copolymer obtained were 50:50 from the integration ratio of the $^1$H-NMR of the copolymer. Mw=5,400; Mw/Mn=2.3

EXAMPLE 7

Resist Production and Test for Pattern Formation

A resist of the following composition was produced.
Composition of Resist:

(a) the polymer obtained in Example 5: 1.5 g (b) a photo acid generator (triphenylsulfonium triflate (TPS)): 0.015 g (c) propylene glycol monomethyl ether acetate: 10 g The mixture of the above components was filtered through a teflon filter of 0.2 μm to produce a resist.

The above resist was spin-coated on a 4-inch silicon substrate. The resulting material was baked on a hot plate at 110° C. for 1 minute to form a thin film of 0.1 μm in thickness. The film was exposed in an exposure area of 5 mm×5 mm, with a $F_2$ excimer laser. Immediately thereafter, baking was conducted on a hot plate at 130° C. for 60 seconds, after which development was conducted by 60 seconds immersion in an aqueous solution containing 2.38% of TMAH ((CH$_3$)$_4$NOH), kept at 23° C. Successively, rinsing with pure water was conducted for 60 seconds. Thus, a relation between the amount of light exposure and the thickness of residual film was examined. As a result, the thickness of resist film became zero when the amount of light exposure was 10 mJ/cm$^2$, and a behavior of positive type resist was seen.

As is clear from the above description, by using the resin of the present invention, there can be obtained a chemically amplified photoresist which can be suitably used in a lithography using a light of 180 nm or less. There were also provided a polymer suitable for production of the above resist, a fluorine-containing phenylmaleimide derivative usable as a raw material for the polymer, and a pattern formation method capable of forming a fine pattern.

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. A fluorine-containing phenylmaleimide derivative represented by the following formula (1):

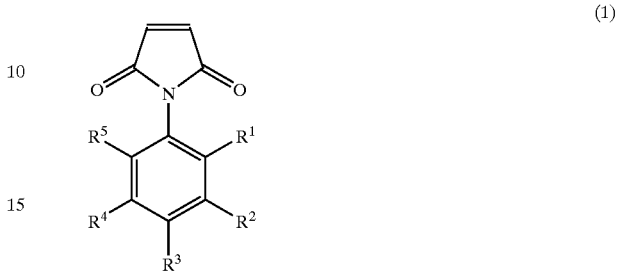

(1)

wherein one of $R^1$, $R^2$, $R^3$, $R^4$ and $R^5$ is a hydroxy group, an alkoxyl group, or an acid-dissociable organic group of 20 or less carbon atoms capable of generating a hydroxy group when decomposed by an acid; at least three of the remainder are each a fluorine atom; and when there is still a remainder, it is a hydrogen atom.

2. A polymer characterized by being obtained by polymerizing monomers containing a fluorine-containing phenylmaleimide derivative represented by the following formula (1a):

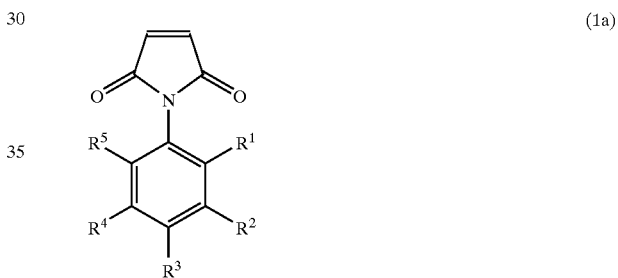

(1a)

wherein one of $R^1$, $R^2$, $R^3$, $R^4$ and $R^5$ is a hydroxy group, an alkoxyl group, or an acid-dissociable organic group of 20 or less carbon atoms capable of generating a hydroxy group when decomposed by an acid; at least two of the remainder are each a fluorine atom; and when there is still a remainder, it is a hydrogen atom.

3. A polymer characterized by containing at least a structural unit represented by the general formula (2) and having a weight-average molecular weight of 2,000 to 200,000

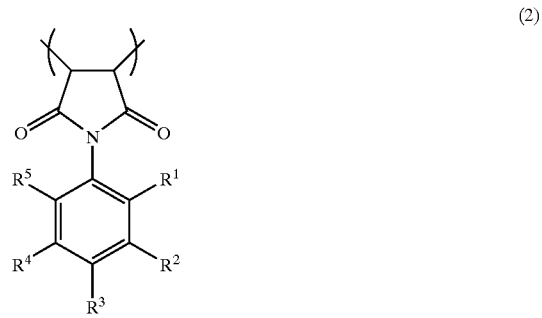

(2)

wherein in formula (2) one of $R^1$, $R^2$, $R^3$, $R^4$ and $R^5$ is a hydroxy group, an alkoxyl group, or an acid-dissociable organic group of 20 or less carbon atoms capable of generating a hydroxy group when decomposed by an acid; at least two of the remainder are each a fluorine atom; and when there is still a remainder, it is a hydrogen atom.

4. A polymer according to claim 3, containing a structural unit represented by the following general formula (3) in addition to the structural unit represented by the general formula (2)

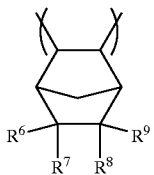

(3)

wherein in formula (3) $R^6$, $R^7$, $R^8$ and $R^9$ are each independently a hydrogen atom, a fluorine atom, a trifluoromethyl group, a hydroxy group, a hydroxyalkyl group, a 1,1,1,3,3,3-hexafluoro-2-hydroxyisopropyl group, a 1,1,1-trifluoro-2-trifluoromethyl-2-hydroxypropyl group, an acid-dissociable organic group of 20 or less carbon atoms capable of generating a 1,1,1,3,3,3-hexafluoro-2-hydroxyisopropyl group when decomposed by an acid, an acid-dissociable organic group of 20 or less carbon atoms capable of generating a 1,1,1-trifluoro-2-trifluoromethyl-2-hydroxypropyl group when decomposed by an acid, or an acid-dissociable organic group of 20 or less carbon atoms capable of generating a carboxy group when decomposed by an acid.

5. A polymer according to claim 3, which is a copolymer containing, in addition to the structural unit represented by the general formula (2), at least one kind of other structural unit and wherein the proportion of the structural unit represented by the general formula (2) in the total structural units of the copolymer is 5 to 90 mole %.

6. A polymer according to claim 4, which is a copolymer containing, in addition to the structural unit represented by the general formula (2), at least one kind of other structural unit and wherein the proportion of the structural unit represented by the general formula (2) in the total structural units of the copolymer is 5 to 90 mole %.

7. A chemically amplified resist composition characterized by containing at least a polymer set forth in claim 2 and a photo acid generator capable of generating an acid when exposed to a light and also characterized in that the proportion of the polymer to the total mass of the polymer and the photo acid generator is 70 to 99.8% by mass and the proportion of the photo acid generator to the total mass of the polymer and the photo acid generator is 0.2 to 30% by mass.

8. A method for pattern formation, characterized by comprising at least a step of coating a chemically amplified resist composition set forth in claim 7, on a to-be-processed substrate, a step of exposing using a light of 180 nm or less wavelength, a step of conducting baking, and a step of conducting development.

9. A method for pattern formation according to claim 8, wherein the light for the exposure is a light of 120 to 180 nm wavelength.

10. A method for pattern formation according to claim 8, wherein the light for the exposure is a $F_2$ excimer laser beam.

* * * * *